(12) United States Patent
Cook et al.

(10) Patent No.: US 7,854,424 B1
(45) Date of Patent: Dec. 21, 2010

(54) SECTIONAL FENCE ASSEMBLY

(75) Inventors: John H. Cook, York, PA (US); Stephen D. Hatcher, Dillsburg, PA (US)

(73) Assignee: Ames True Temper, Inc., Camp Hill, PA (US)

( * ) Notice: Subject to any disclaimer, the term of this patent is extended or adjusted under 35 U.S.C. 154(b) by 483 days.

(21) Appl. No.: 12/001,854

(22) Filed: Dec. 13, 2007

(51) Int. Cl.
*A01G 1/08* (2006.01)

(52) U.S. Cl. .............. 256/24; 47/33; 52/102; 16/268

(58) Field of Classification Search ........... 256/24, 256/47; 403/89, 162, 163, 331, 353; 47/32, 47/32.4, 32.7, 33; 52/102, 587.1; 16/268
See application file for complete search history.

(56) References Cited

U.S. PATENT DOCUMENTS

| | | | |
|---|---|---|---|
| D4,196 S | 6/1870 | Omensetter | |
| 173,403 A * | 2/1876 | Hafele | 256/24 |
| 264,259 A * | 9/1882 | Denning | 256/24 |
| 404,936 A | 6/1889 | Shellaberger | |
| 635,553 A * | 10/1899 | Kippels | 211/199 |
| 899,605 A * | 9/1908 | Miller | 256/33 |
| 916,228 A | 3/1909 | Trebilcock | |
| D39,977 S | 5/1909 | Peter | |
| 926,010 A | 6/1909 | Liles | |
| 932,355 A * | 8/1909 | Thrasher et al | 256/26 |
| 1,142,233 A * | 6/1915 | Bryning | 256/33 |
| 1,153,560 A | 9/1915 | Miller | |
| 1,220,961 A | 3/1917 | Darley | |
| 1,232,609 A | 7/1917 | Rowe | |
| 1,284,569 A | 12/1918 | Bikowski | |
| 1,456,519 A * | 5/1923 | Semenoff et al. | 256/24 |
| D71,179 S | 10/1926 | Espie, Jr. | |
| 2,048,889 A | 7/1936 | Panzer | |
| 2,417,578 A * | 3/1947 | White | 52/581 |
| D157,052 S | 1/1950 | Kaplan et al. | |
| 2,600,666 A * | 6/1952 | Martensen | 256/33 |
| 2,651,502 A * | 9/1953 | Carvelo et al. | 256/33 |
| 2,764,389 A * | 9/1956 | Daniels | 256/48 |
| 2,883,159 A * | 4/1959 | Esmay | 256/1 |
| 3,347,527 A * | 10/1967 | Andrews | 256/12.5 |
| 3,648,981 A | 3/1972 | Allen | |
| 3,767,167 A | 10/1973 | Rasmussen | |
| 3,815,877 A | 6/1974 | Turner | |
| 4,073,478 A | 2/1978 | Bermudez | |
| 4,303,226 A | 12/1981 | Powell et al. | |
| 4,844,420 A * | 7/1989 | Oster | 256/1 |
| 4,844,424 A | 7/1989 | Knudslien | |
| 5,063,876 A | 11/1991 | Harris | |
| 5,414,956 A * | 5/1995 | Kheradpir | 47/33 |
| 5,553,648 A | 9/1996 | Goharjou | |
| 5,609,327 A | 3/1997 | Amidon | |
| 5,660,144 A | 8/1997 | Venti | |
| 5,704,592 A | 1/1998 | White et al. | |
| 5,716,041 A | 2/1998 | Groves | |

(Continued)

*Primary Examiner*—Joshua T Kennedy
(74) *Attorney, Agent, or Firm*—Eckert Seamans Cherin & Mellot, LLC; David C. Jenkins, Esq.

(57) ABSTRACT

A sectional fence assembly having a coupling device with a loop, disposed at an angle relative to the body of the fence section is disposed on one side of the fence section body and a hook is disposed on the opposing side of the fence section body. A plurality of such fence sections may be coupled in series.

14 Claims, 4 Drawing Sheets

U.S. PATENT DOCUMENTS

| | | |
|---|---|---|
| 5,718,414 A | 2/1998 | Deloach et al. |
| 5,996,973 A | 12/1999 | Campbell |
| D423,683 S | 4/2000 | Dashevsky |
| D425,206 S | 5/2000 | Dashevsky |
| 6,108,969 A * | 8/2000 | Danna et al. ............ 47/33 |
| 6,257,559 B1 | 7/2001 | Mouri |
| D450,856 S | 11/2001 | McNeill |
| 6,386,517 B1 * | 5/2002 | McNeill ............ 256/33 |
| 6,622,426 B2 * | 9/2003 | Conde ............ 47/33 |
| 6,676,113 B2 | 1/2004 | Christensen et al. |
| 6,733,204 B1 | 5/2004 | Paniccia |
| 2003/0230026 A1 * | 12/2003 | Dillon ............ 47/33 |
| 2004/0155232 A1 | 8/2004 | Priefert |
| 2006/0118771 A1 | 6/2006 | Stein et al. |

* cited by examiner

SECTIONAL FENCE ASSEMBLY

BACKGROUND OF THE INVENTION

1. Field of the Invention

This invention relates to a sectional fence assembly and, more specifically to a sectional fence assembly having a hook and eyeloop coupling wherein the eyeloop extends in a plane that is angled relative to a fence section body.

2. Background Information

Sectional fence assemblies are typically used for decorative purposes about flowerbeds and gardens and are not typically used as a barrier to travel. The sectional fence assemblies typically include a plurality of generally identical fence sections. The fence sections are usually about three to four feet in length, have decorative, generally planar bodies, and a mounting device, typically one or more spikes. The fence section bodies are typically made from metal or plastic. The fence section bodies are structured to be coupled together by a two, or more, part coupling device. Usually, a fence section body has one coupling device element, e.g. a hook, on one lateral side and the other coupling device element, e.g. a loop, on the opposing lateral side. In this configuration, multiple fence sections may be linked in series with a one fence section having a hook on a first side coupled to another fence section having a loop on the second side.

Most users, that is, installers, assemble the sectional fence assembly in place. That is, rather than linking the fence section together and then inserting the mounting devices into the ground, a single fence section is installed in the ground and then the adjacent fence section is installed and simultaneously coupled to the first section. Accordingly, a typical sectional fence assembly includes a coupling device wherein the fence sections are coupled as one fence section mounting device is moved downwardly into the ground. As noted above, a convenient coupling device for this type of installation is a hook-and-eye device.

It is noted that the sectional fence bodies, typically, are shaped with a repeating pattern, e.g., a picket fence. As such, the space between fence sections is minimized so that the interruption of the pattern is minimized. Accordingly, the hook typically extends laterally a relatively short distance. The hook of the coupling device is typically disposed in the plane of the fence section body. On the opposite lateral side of the fence section is the loop. The loop defines an opening that extends generally horizontally. The hook generally bends downwardly so that, during installation, the installer moves the hook downwardly into the loop opening. However, it is understood that a hook could also bend upwardly and an installer could move the loop downwardly over the hook.

A loop must accomplish at least two functions. The loop must allow for easy installation and must be robust enough to resist breaking due to environmental contacts, e.g. wind, being bumped by a lawn mower, and so forth. Thus, loops tend to be either thin tubular members or thicker, wider hoops. A hoop-like loop, typically, has a thick body to resist breaking and a wide opening. This configuration allowed for easy installation and allowed the different fence sections to rotate relative to each other when bumped. However, such hoop-like loops, due to their loose fit, also allowed the adjacent fence sections to be vertically misaligned and did not provide a snug fit. Further, during packaging and shipping, the horizontally extending hoop-like loops extended beyond the plane of the fence body making it difficult to align and stack the fence sections. A tube-like loop, typically, corresponds to the size of the hook but has an elongated body for strength. When an elongated hook in disposed in an elongated tube, the separate fence sections tend to positioned in vertical alignment. Such tube-like loops, however, could make installation difficult as the hook-and-loop were about the same size and thus difficult to couple. Also, when one fence section was bumped and rotated relative to an adjacent fence, the tube-like loops tended to break or break the hook.

SUMMARY OF THE INVENTION

The sectional fence assembly disclosed herein provides for a coupling device wherein the loop is hoop-like, but angled relative to the body of the fence section. This configuration has a number of advantages. First, like traditional hoop-like loops which were disposed generally perpendicular to the fence section body, the angled loops allow for easy installation as the opening tends to be larger than the associated hook. That is, an installer may angle the hook to approach the loop from a perpendicular direction allowing for easy installation. Once the hook is through the loop, the installer twists the fence section having the hook to be vertically aligned with the fence section having the loop. In this configuration, the perpendicular width of the loop opening and the perpendicular width of the hook are about the same. Thus, the hook is disposed snugly in the loop. Further, because the loop is angled, the fence sections may be stacked immediately adjacent to each other for packaging and shipping. That is, the angled loops, essentially, "spoon" each other when the fence sections are stacked. Preferably, the loop has at least one groove structured to correspond to the shape of the hook. The groove helps to maintain the fence sections in the installed alignment by providing a set orientation for the hook relative to the loop.

BRIEF DESCRIPTION OF THE DRAWINGS

A full understanding of the invention can be gained from the following description of the preferred embodiments when read in conjunction with the accompanying drawings in which.

DESCRIPTION OF THE PREFERRED EMBODIMENTS

As used herein, "corresponding" parts that are structured to be coupled together with a first part disposed within a second part means that the second part is slightly larger than the first part. For example, a lid and an associated container generally correspond to each other.

As set forth below, a fence section has generally planar body. As used herein "lateral" means on, or relating to, the left and/or right sides of the body. As used herein "perpendicular" means in a direction generally perpendicular to the plane of the fence section body.

As used herein, the word "unitary" means a component is created as a single piece or unit; that is, a component that includes pieces that are created separately and then coupled together as a unit is not a "unitary" component or body. It is further noted that different elements of a unitary body may be said to be "coupled" together.

As used herein, "coupled" means a link between two or more elements, whether direct or indirect, so long as a link occurs.

As used herein, "directly coupled" means that two elements are directly in contact with each other.

As used herein, "fixedly coupled" means that two components are so coupled to move as one.

Figure 1:
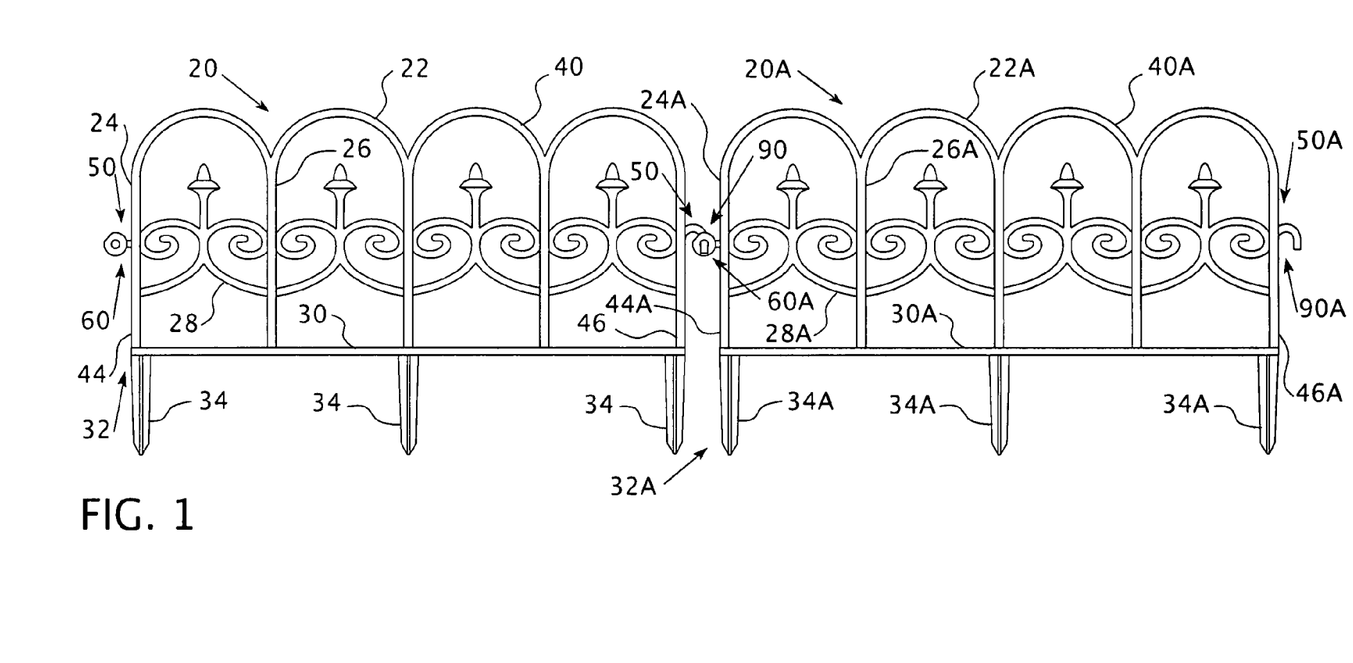
FIG. 1 is a front view of a sectional fence assembly.

As shown in FIG. 1, a sectional fence assembly includes two or more fence sections 20, 20A joined together by a coupling device 50. As set forth bellow, only the first fence section 20 will be described in detail. It is understood that similar components on the second fence section 20A will have similar reference numbers followed by the letter "A." As is known in the art, the first and second fence sections 20, 20A are generally vertically aligned. That is, each fence section 20, 20A extends generally vertically. The fence sections 20, 20A may also be aligned so as to form a generally straight sectional fence assembly, or, the fence sections 20, 20A may form a corner at any coupling device 50. Each fence section 20, 20A is generally identical and the coupling device 50 is a two-component coupling device 50 with one component disposed on a first lateral side of a fence section 20 and the second component disposed on the opposite lateral side. In this configuration, the fence sections 20, 20A may be linked in series.

Figure 2:
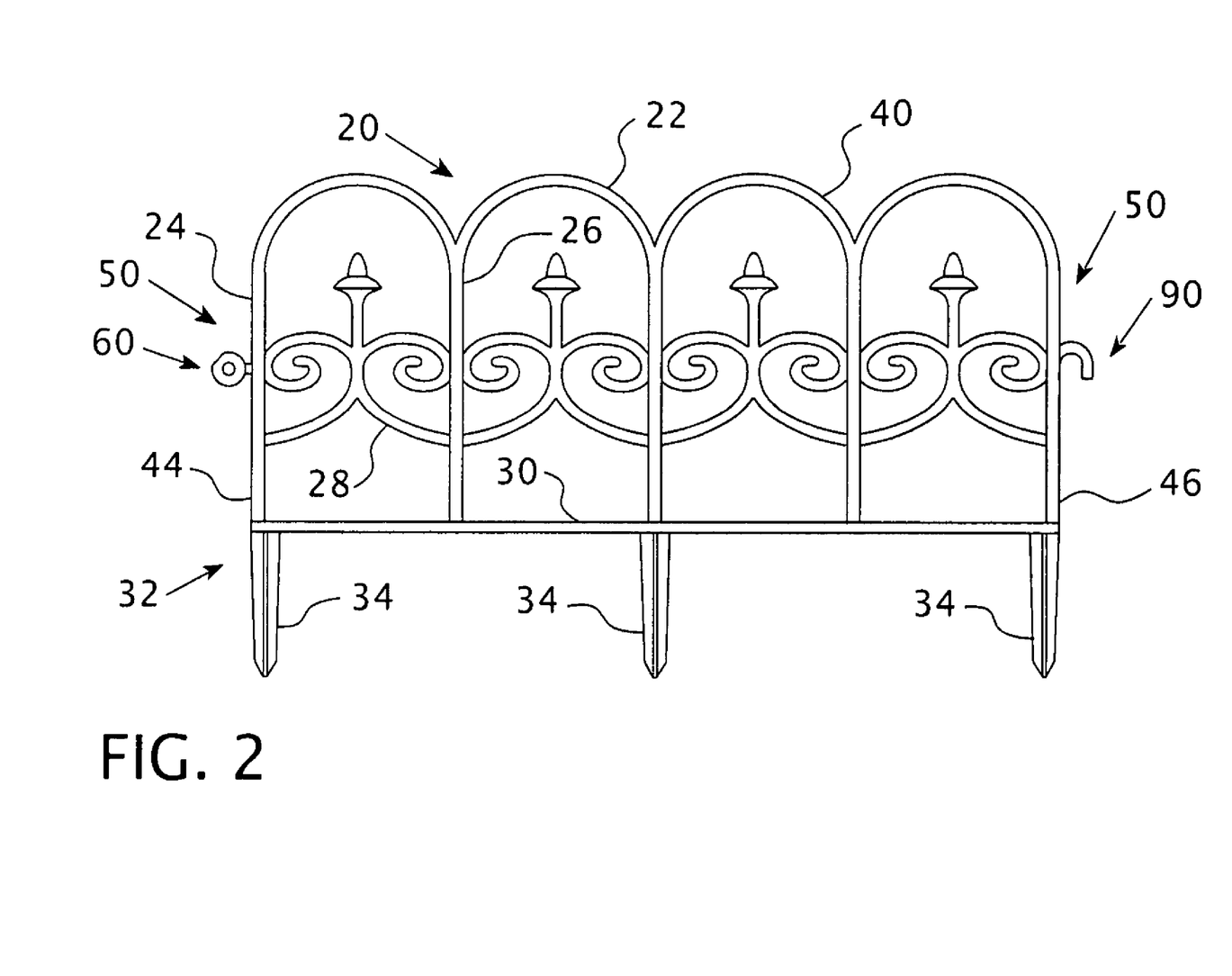
FIG. 2 is a front view of a fence section.

As shown in FIG. 2, each fence section 20 includes a generally planar body 22 that is typically made from metal or plastic. Typically, the fence section body 22 is formed or shaped into a decorative pattern. That is, as shown, the fence section body 22 includes a plurality of elongated elements 24 that form either arches 26 or a Fleur De Lys, or lily flower, pattern 28. This specific pattern is exemplary only and, except as noted below with respect to the size of the hook 90 and eyeloop 60, does not form part of this invention. The fence section body 22 may further include a base plate 30 and at least one mounting device 32. As shown the mounting device 32 is a series of spikes 34. The fence section body 22 has a front face 40, a back face 42 (FIG. 4), a first lateral side 44, as shown the left side, and a second lateral side 46, as shown the right side.

Figure 3:
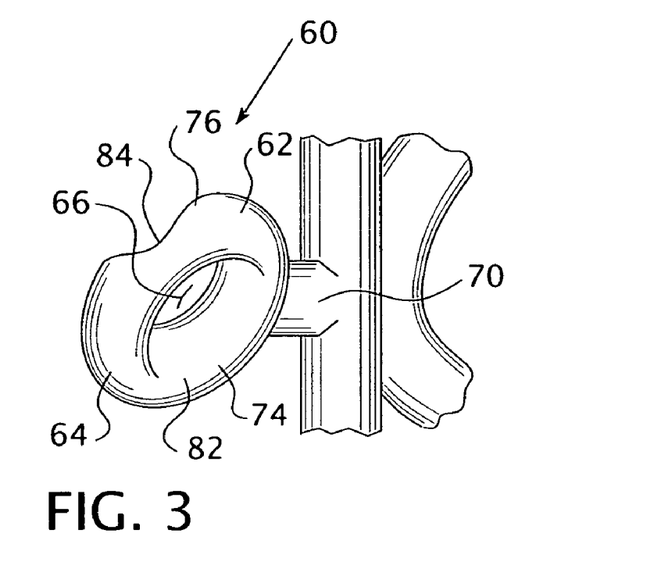
FIG. 3 is an isometric view of an eyeloop.
Figure 4:
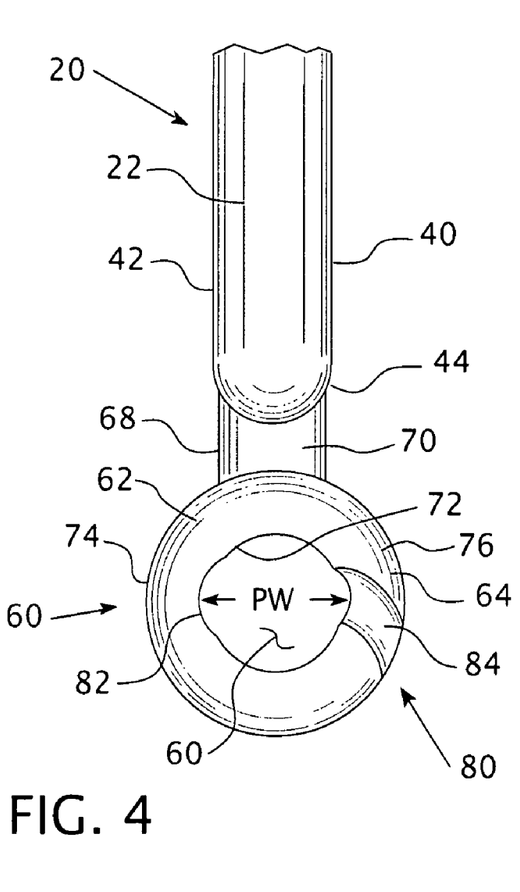
FIG. 4 is a top view of an eyeloop.

The coupling device 50 includes an eyeloop 60 and a hook 90. As shown in FIGS. 3 and 4, the eyeloop 60 is disposed on the fence section body first lateral side 44. The eyeloop 60 has a body 62 defining, preferably, a generally circular loop 64 extending in a plane. The loop 64 defines an opening 66. The loop 64 may be disposed on an eyeloop mounting 68, such as a rod 70. The eyeloop 60 is angled relative to the plane of the fence section body 22 plane. That is, as shown on FIG. 5 and represented by angle θ, the eyeloop 60 plane is angled less than, or equal to, 45 degrees, and more preferably about 30 degrees, relative to the fence section body 22 plane. As shown in FIG. 4, in this configuration the eyeloop body opening 66 has a perpendicular width, "PW," that is less than the width of the eyeloop body opening 66 when viewed from a position normal to, that is, at a right angle to, the plane of the eyeloop 60. The eyeloop body opening 66 has a perpendicular width corresponding to the hook body distal end perpendicular width (discussed below).

Figure 5:
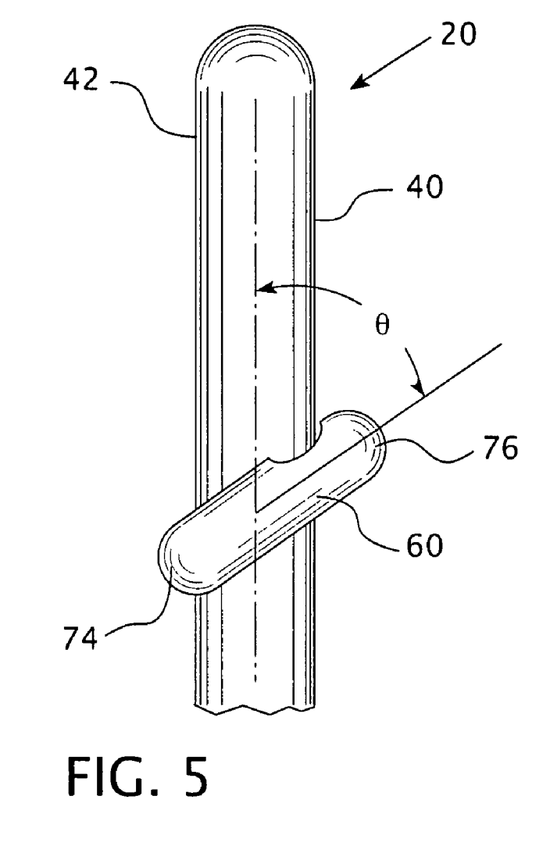
FIG. 5 is an end view of an eyeloop.

Preferably, the eyeloop body 62 also includes at least one groove 80 shaped to correspond to the hook 90. That is, the eyeloop body 62 has an inner surface 72 adjacent to the eyeloop body opening 66. Further, due to angle of the eyeloop 60 relative to the plane of the fence section body 22, and because the fence section body 22 typically extends vertically, the eyeloop body 62 has a lower side 74 and an upper side 76. It is noted that the lower side 74 and the upper side 76 are not to be confused with a lower and upper surface. That is, the lower side 74 and the upper side 76 are defined as being below or above, respectively, the center of the loop 64. The at least one groove 80 preferably include two grooves; a first groove and a second groove 82, 84. The first groove 82 is disposed on the lower side 74 at the inner surface 72. As the hook distal end 98 (described below) is generally straight, the first groove 82 is also generally straight. The second groove 84 is, preferably, curved to correspond to the shape of the hook bend 96 (described below).

Figure 6:
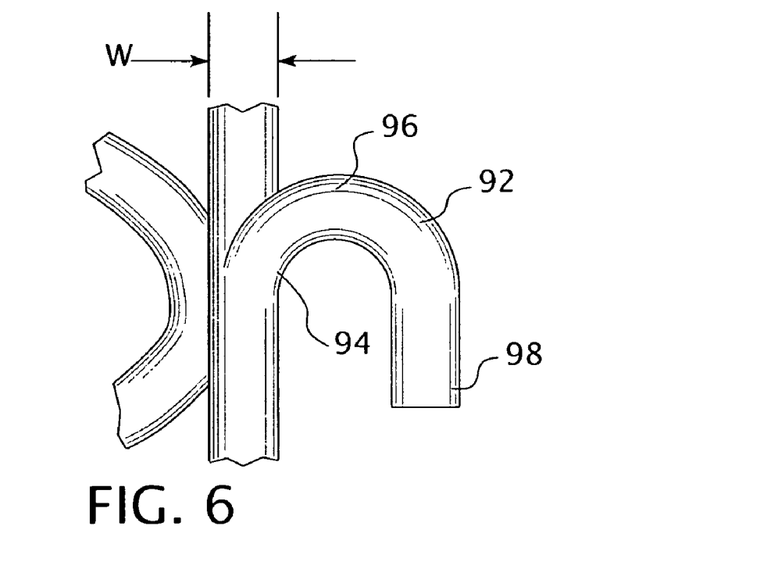
FIG. 6 is an isometric view of a hook.

The hook 90 is disposed on the fence section body second lateral side 46. The hook 90 has a generally body 92 disposed in a plane with a first, proximal end 94, a bend 96, and a second, distal end 98. Preferably, the hook body 92 has a generally circular cross-sectional area. The hook second, distal end 98 is sized to extend through a fence section eyeloop 60. The hook 90 extends generally in the plane of the fence section body 22. Preferably, the hook second, distal end 98 extends downwardly.

To reduce the visual break in the fence section body 22 pattern, the elements of the coupling device 50 preferably have about the same visual appearance as the decorative elements. That is, where, for example, the arch elements 26 have a lateral width, "W," the fence section eyeloop body 22 and the hook body 92 have a generally similar lateral width. Preferably, the fence section eyeloop body loop 64 has an outer diameter of between about 0.930 and 0.910 inch, and more preferably about 0.920 inch. The fence section eyeloop body loop 64 has an inner diameter of between about 0.310 and 0.330 inch, and more preferably about 0.320 inch. The hook body 92, which preferably has a circular cross-sectional area, has a diameter of between about 0.305 and 0.310 inch, and more preferably about 0.380 inch.

In this configuration, the sectional fence assembly may be easily assembled as follows. The first fence section 20 is installed in the ground, or other substrate, and is positioned to extend generally vertically. That is, the spikes 34 are driven into the ground to support the first fence sections 20 in a generally vertical orientation. The second fence section 20A is then positioned adjacent to the first fence section 20 and rotated so that the plane of the second fence section 20A is generally perpendicular to the plane of the first fence section eyeloop 60. In this orientation, the second fence section hook 90A may pass easily through the first fence section eyeloop 60. Once the second fence section hook 90A is inserted through the first fence section eyeloop 60, the second fence section 20A is rotated so that the vertical axis thereof is generally parallel to the vertical axis of the first fence section 20. This motion causes the second fence section hook 90A to become seated in the first fence section eyeloop first groove 82 and second groove 84. Additional fence sections 20C, 20D . . . 20N (not shown) may be coupled in series in a similar manner.

While specific embodiments of the invention have been described in detail, it will be appreciated by those skilled in the art that various modifications and alternatives to those details could be developed in light of the overall teachings of the disclosure. For example, the eyeloop 60 is described as being generally circular. It is understood that loops having different shapes are equivalent structures. Accordingly, the particular arrangements disclosed are meant to be illustrative only and not limiting as to the scope of the invention which is to be given the full breadth of the claims appended and any and all equivalents thereof.

What is claimed is:

1. A sectional fence assembly comprising:

a first fence section having a generally planar body with a first lateral side, a second lateral side and an eyeloop;

said eyeloop having a body defining a loop extending in a plane, said loop defining an opening;

said eyeloop coupled to said first fence section body and disposed at said first fence section body first side, said eyeloop plane being angled less than, or equal to, 45 degrees relative to said first fence section body plane;

a second fence section having a generally planar body with a first lateral side, a second lateral side, and a hook;

said hook having a generally planar body with a first, proximal end, a bend, and a second, distal end, said second, distal end sized to extend through said first fence section eyeloop;

said hook coupled to said second fence section body and disposed at said second fence section body second lateral side, said hook plane being generally parallel to said second fence section body plane; and wherein said first fence section and said second fence section may be coupled together with said first fence section body and said second fence section body disposed with the vertical axes being generally aligned and wherein said first fence section body first lateral side is disposed adjacent to said second fence section body second lateral side and with said second fence section hook body distal end extending through said first fence section eyeloop body opening;

said second fence section hook body distal end has a perpendicular width;

said first fence section eyeloop body is angled relative to said first fence section body plane so that said eyeloop body opening has a perpendicular width corresponding to said hook body distal end perpendicular width;

said first fence section eyeloop body has an inner surface; and said first fence section eyeloop inner surface having at least one groove disposed thereon, said groove sized to correspond to said second fence section hook body.

2. The sectional fence assembly of claim 1 wherein:

said first fence section eyeloop body has a lower side and an upper side;

said first fence section eyeloop inner surface at least one groove includes a first groove and a second groove;

said first groove disposed on said eyeloop lower side and shaped to correspond to said second fence section hook body distal end; and said second groove disposed on said eyeloop upper side and shaped to correspond to said second fence section hook body bend.

3. The sectional fence assembly of claim 2 wherein:

said first fence section eyeloop body loop has an outer diameter of between about 0.91 and 0.93 inch; and said first fence section eyeloop body loop has an inner diameter of between about 0.31 and 0.33 inch.

4. The sectional fence assembly of claim 3 wherein:

said first fence section eyeloop body loop has an outer diameter of about 0.92 inch; and said first fence section eyeloop body loop has an inner diameter of about 0.32 inch.

5. A fence section for a sectional fence assembly comprising:

a first fence section and a second fence section, each fence section having a generally planar body with a first lateral side, a second lateral side, a hook and an eyeloop;

each said eyeloop having a body defining a loop extending in a plane, said loop defining an opening;

said first fence section eyeloop coupled to said first fence section body and disposed at said first fence section body first lateral side, said eyeloop plane being angled less than, or equal to, 45 degrees relative to said first fence section body plane;

said second fence section hook having a generally planar body with a first, proximal end, a bend, and a second, distal end, said second, distal end sized to extend through said first fence section eyeloop;

said second fence section hook coupled to said second fence section fence section body and disposed at said second fence section body second lateral side, said second fence section hook plane being generally parallel to said second fence section body plane;

said second fence section hook body distal end has a perpendicular width; and said first fence section eyeloop body is angled relative to said first fence section body plane so that said first fence section eyeloop body opening has a perpendicular width corresponding to said second fence section hook body distal end perpendicular width;

said first fence section eyeloop body has an inner surface; and said first fence section eyeloop inner surface having at least one groove disposed thereon, said groove sized to correspond to said second fence section hook body.

6. The fence section of claim 5 wherein:

said first fence section eyeloop body has a lower side and an upper side;

said first fence section eyeloop inner surface at least one groove includes a first groove and a second groove;

said first groove disposed on said first fence section eyeloop lower side and shaped to correspond to said second fence section hook body distal end; and said second groove disposed on said eyeloop upper side and shaped to correspond to said second fence section hook body bend.

7. The fence section of claim 6 wherein:

said first fence section eyeloop body loop has an outer diameter of between about 0.91 and 0.93 inch; and said first fence section eyeloop body loop has an inner diameter of between about 0.31 and 0.33 inch.

8. The fence section of claim 7 wherein:

said first fence section eyeloop body loop has an outer diameter of about 0.92 inch; and said first fence section eyeloop body loop has an inner diameter of about 0.32 inch.

9. A sectional fence assembly comprising:

a first fence section having a generally planar body with a first lateral side, a second lateral side and an eyeloop;

said eyeloop having a body defining a loop extending in a plane, said loop defining an opening;

said eyeloop coupled to said first fence section body and disposed at said first fence section body first side, said eyeloop plane being angled less than, or equal to, 45 degrees relative to said first fence section body plane;

a second fence section having a generally planar body with a first lateral side, a second lateral side, and a hook;

said hook having a generally planar body with a first, proximal end, a bend, and a second, distal end, said second, distal end sized to extend through said first fence section eyeloop;

said hook coupled to said second fence section body and disposed at said second fence section body second lateral side, said hook plane being generally parallel to said second fence section body plane;

said first fence section eyeloop body has an inner surface, said first fence section eyeloop inner surface having at least one groove disposed thereon, said groove sized to correspond to said second fence section hook body; and wherein said first fence section and said second fence section may be coupled together with said first fence section body and said second fence section body disposed in generally aligned planes with said first fence section body first lateral side disposed adjacent to said second fence section body second lateral side and with said second fence section hook body distal end extending through said first fence section eyeloop body opening.

10. The sectional fence assembly of claim 9 wherein:

said first fence section eyeloop body has a lower side and an upper side;

said first fence section eyeloop inner surface at least one groove includes a first groove and a second groove;

said first groove disposed on said eyeloop lower side and shaped to correspond to said second fence section hook body distal end; and said second groove disposed on said eyeloop upper side and shaped to correspond to said second fence section hook body bend.

11. The sectional fence assembly of claim 9 wherein:

said first fence section body includes at least one elongated member having a lateral width;

said second fence section body includes at least one elongated member having a lateral width;

said first fence section eyeloop body has a lateral width;

said second fence section hook body has a lateral width; and said first fence section body elongated member lateral width, said second fence section body elongated member lateral width, said first fence section eyeloop body lateral width, and said second fence section hook body lateral width being generally similar.

12. A fence section for a sectional fence assembly comprising:

a generally planar body with a first lateral side, a second lateral side, a hook and an eyeloop;

said eyeloop having a body defining a loop extending in a plane, said loop defining an opening having a predetermined cross-sectional area;

said eyeloop coupled to said fence section body and disposed at fence section body first lateral side, said eyeloop plane being angled less than, or equal to, 45 degrees relative to said first fence section body plane;

said hook having a generally planar body having an outer shape with a first, proximal end, a bend, and a second, distal end, said second, distal end sized to extend through a fence section eyeloop of said predetermined cross-sectional area;

said hook coupled to said fence section body and disposed at said fence section body second lateral side, said hook plane being generally parallel to said fence section body plane;

said eyeloop body has an inner surface; and said eyeloop inner surface having at least one groove disposed thereon, said groove sized to correspond to a hook body of said outer shape.

13. The fence section of claim 12 wherein:

said eyeloop body has a lower side and an upper side;

said eyeloop inner surface at least one groove includes a first groove and a second groove;

said first groove disposed on said eyeloop lower side and shaped to correspond to said second fence section hook body outer shape at said distal end; and said second groove disposed on said eyeloop upper side and shaped to correspond to said second fence section hook body outer shape at said bend.

14. The fence section of claim 12 wherein:

said body includes at least one elongated member having a lateral width;

said eyeloop body has a lateral width;

said hook body has a lateral width; and said body elongated member lateral width, said eyeloop body lateral width, and said hook body lateral width being generally similar.

* * * * *

UNITED STATES PATENT AND TRADEMARK OFFICE
CERTIFICATE OF CORRECTION

PATENT NO. : 7,854,424 B1  Page 1 of 1
APPLICATION NO. : 12/001854
DATED : December 21, 2010
INVENTOR(S) : John H. Cook et al.

It is certified that error appears in the above-identified patent and that said Letters Patent is hereby corrected as shown below:

Column 1, line 67, "in disposed in" should read --is disposed in--.
Column 2, line 1, "to positioned" should read --to be positioned--.
Column 2, line 57, "has generally" should read --has a generally--.
Column 3, line 10, "bellow" should read --below--.
Column 3, line 36, "As shown the" should read --As shown, the--.
Column 3, line 39, "shown the left side" should read --shown on the left side--.
Column 3, line 39, (second instance) "shown the" should read --shown on the--.
Column 4, line 3, "include two grooves" should read --includes two grooves--.
Column 4, line 11, "a generally body" should read --a body--.
Column 6, line 9, "fence section fence section body" should read --fence section body--.
Column 8, line 5, "at fence section body" should read --at said fence section body--.
Column 8, line 7, Claim 12, "said first fence" should read --said fence--.
Column 8, line 26, Claim 13, "said second fence" should read --said fence--.

Signed and Sealed this
Twenty-fifth Day of September, 2012

David J. Kappos
*Director of the United States Patent and Trademark Office*